US012445510B2

(12) United States Patent
Lu et al.

(10) Patent No.: US 12,445,510 B2
(45) Date of Patent: Oct. 14, 2025

(54) PRESENTATION METHOD AND APPARATUS, AND ELECTRONIC DEVICE (71) Applicant: BEIJING ZITIAO NETWORK TECHNOLOGY CO., LTD., Beijing (CN)

(72) Inventors: Shuhan Lu, Beijing (CN); Gewei Yang, Beijing (CN); Mingzhe Ruan, Beijing (CN); Qiang Deng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 40 days.

(21) Appl. No.: 18/210,536

(22) Filed: Jun. 15, 2023

(65) Prior Publication Data
US 2023/0421623 A1  Dec. 28, 2023

Related U.S. Application Data (63) Continuation of application No. PCT/CN2021/131630, filed on Nov. 19, 2021.

(30) Foreign Application Priority Data

Dec. 18, 2020 (CN) .......................... 202011513894.6

(51) Int. Cl.
H04L 65/611 (2022.01)
H04L 65/65 (2022.01)

(52) U.S. Cl.
CPC ............ H04L 65/611 (2022.05); H04L 65/65 (2022.05)

(58) Field of Classification Search
CPC ............................... H04L 65/611; H04L 65/65
See application file for complete search history.

(56) References Cited

U.S. PATENT DOCUMENTS 6,025,871 A    2/2000  Kantor et al.
6,195,094 B1 * 2/2001  Celebiler .............. G06F 3/0481
                                                   715/764
(Continued)

FOREIGN PATENT DOCUMENTS

CN    104461219 A    3/2015
CN    105210394 A   12/2015
(Continued)

OTHER PUBLICATIONS

"How to Use Zoom on an iPad," Apr. 7, 2020. (Year: 2020).*
(Continued)

Primary Examiner — Andrew C Georgandellis
(74) Attorney, Agent, or Firm — BakerHostetler (57) ABSTRACT The embodiments of the present disclosure disclose a presentation method and apparatus, and an electronic device. A specific embodiment of the method comprises: in a multimedia conference interface, switching a display state of a real-time multimedia stream presentation area, wherein the display state includes an unfolded state and a folded state, the unfolded state including the parallel presentation of the real-time multimedia stream presentation area and a shared content area, and the folded state including the folding of the real-time multimedia stream presentation area. Thus, a new presentation method for a multimedia conference is provided.

17 Claims, 7 Drawing Sheets

(56) References Cited

U.S. PATENT DOCUMENTS

| | | | |
|---|---|---|---|
| 9,756,286 B1* | 9/2017 | Faulkner | H04L 65/1093 |
| 2010/0002069 A1 | 1/2010 | Eleftheriadis et al. | |
| 2012/0062688 A1 | 3/2012 | Shen et al. | |
| 2016/0154536 A1* | 6/2016 | Kim | G06F 9/451 |
| | | | 715/768 |
| 2016/0349936 A1* | 12/2016 | Cho | G06F 3/04897 |
| 2017/0109008 A1 | 4/2017 | Darby et al. | |
| 2018/0063480 A1 | 3/2018 | Luks et al. | |
| 2018/0196583 A1 | 7/2018 | Astavans et al. | |
| 2019/0339822 A1 | 11/2019 | Devine et al. | |
| 2019/0384485 A1 | 12/2019 | Faulkner et al. | |

FOREIGN PATENT DOCUMENTS

| | | |
|---|---|---|
| CN | 107169147 A | 9/2017 |
| CN | 107509052 A | 12/2017 |
| CN | 108933965 A | 12/2018 |
| CN | 109495711 A | 3/2019 |
| CN | 109862301 A | 6/2019 |
| CN | 111596985 A | 8/2020 |
| CN | 111818292 A | 10/2020 |
| CN | 111880865 A | 11/2020 |
| CN | 112672092 A | 4/2021 |
| JP | 2002-259315 A | 9/2002 |
| JP | 2014-090231 A | 5/2014 |
| JP | 2014-174767 A | 9/2014 |
| JP | 2015-126457 A | 7/2015 |
| JP | 2018-535461 A | 11/2018 |
| WO | WO 2014/165976 A1 | 10/2014 |
| WO | WO 2017/036290 A1 | 3/2017 |

OTHER PUBLICATIONS

"Zoom Side by Side Mode," Jun. 16, 2020. (Year: 2020).*

"The Magic of Side-by-Side View in Zoom," Aug. 20, 2020. (Year: 2020).*

International Patent Application No. PCT/CN2021/131630; Int'l Search Report; dated Jan. 30, 2022; 3 pages.

Shi Wang-Yang et al.; "Design and Implementation of Video Conferencing System Based on Web"; Journal of Langfang Teachers College (Natural Science Edition); vol. 15 No. 2; Apr. 2015; p. 30-34 (contains English Abstract).

Chen Jian; "The application of intelligent conference system in Conference management"; Electronics World Technical Exchange; Sep. 2017; p. 197.

European Patent Application No. 21905440.0; Extended Search Report; dated Apr. 29, 2024; 9 pages.

"State object—the new Focus Mode in Microsoft Teams"; https://clouddoktor wordpress.com/2020/07/24/zustandsobjekt-der-neue-focus-mode-in-microsoft teams/; The Cloud Docter; Jul. 2020; accessed Jul. 25, 2024; 10 pages.

Feng L., et al., "Application of WebSocket and MQTT in Web Real-Time Communication System," System Construction, 2016, vol. 25, No. 5, pp. 28-33 with English Abstract.

Feng Rui et al.; "The Constrution of Learning Social Networking Sites in the Perspective Connectionism"; Journal of Distance Education; Issue 3; Apr. 2013; p. 10-16 (English Abstract on last page).

Written Opinion for International Application No. PCT/CN2021/131630, mailed Jan. 30, 2022, 9 pages with translation.

* cited by examiner

Switch a display state of a real-time multimedia stream presentation region in a multimedia conference interface — 101

PRESENTATION METHOD AND APPARATUS, AND ELECTRONIC DEVICE

CROSS-REFERENCE TO RELATED APPLICATIONS

The present application is a continuation of International Application No. PCT/CN2021/131630, titled "PRESENTATION METHOD AND APPARATUS, AND ELECTRONIC DEVICE", filed on Nov. 19, 2021, which claims the priority to Chinese Patent Application No. 202011513894.6, titled "PRESENTATION METHOD AND APPARATUS, AND ELECTRONIC DEVICE", filed on Dec. 18, 2020 with the China National Intellectual Property Administration, both of which are incorporated herein by reference in there entireties.

FIELD

The present disclosure relates to the technical field of Internet, and in particular to a display method, a display apparatus, and an electronic device.

BACKGROUND

With the development of the Internet, more and more users use functions of terminal devices to facilitate their work and life. For example, the user may initiate a multimedia conference with other users online by using a terminal device. Users may interact remotely through online multimedia conferences, and may start meetings without having to gather in one place. Through multimedia conferences, the limitations of conventional face-to-face meetings on location and venue have been largely avoided.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

In a first aspect, a display method is provided according to an embodiment of the present disclosure. The method includes: switching a display state of a real-time multimedia stream presentation region in a multimedia conference interface. The display state includes an expanding state and a folding state. The expanding state includes a state in which the real-time multimedia stream presentation region and a shared content region are displayed side by side. The folding state includes a state in which the real-time multimedia stream presentation region is folded.

In a second aspect, a display apparatus is provided according to an embodiment of the present disclosure. The apparatus includes a switching unit. The switching unit is configured to switch a display state of a real-time multimedia stream presentation region in a multimedia conference interface. The display state includes an expanding state and a folding state. The expanding state includes a state in which the real-time multimedia stream presentation region and a shared content region are displayed side by side. The folding state includes a state in which the real-time multimedia stream presentation region is folded.

In a third aspect, an electronic device is provided according to an embodiment of the present disclosure. The electronic device includes one or more processors and a memory. The memory stores one or more programs. The one or more programs, when executed by the one or more processors, cause the one or more processors to perform the display method provided in the first aspect.

In a fourth aspect, a computer-readable medium is provided according to an embodiment of the present disclosure. The computer-readable medium storage stores a computer program. The computer program, when executed by a processor, causes the processor to perform the display method provided in the first aspect.

With the display method, the display apparatus, and the electronic device according to the embodiments of the present disclosure, a display state of a real-time multimedia stream presentation region may be switched in a multimedia conference interface. The real-time multimedia stream presentation region in the expanding state may be displayed side by side with the shared content region, providing the user with information about real-time multimedia streams without blocking shared contents. For the real-time multimedia stream presentation region in the folding state, the area of the real-time multimedia stream presentation region may be minimized. By performing switching between the expanding state and the folding state, flexible transformation of the real-time multimedia stream presentation region may be performed, achieving a balance between providing more content and occupying less space, flexibly adopting different display states based on actual situations of a multimedia conference, and thereby improving the efficiency of the multimedia conference.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that, the terms "first" "second" and so on mentioned in the present disclosure are only used to distinguishing different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

The names of messages or information exchanged between multiple devices in the embodiments of the present disclosure are only illustrative, and are not intended to limit the scope of the messages or information.

Figure 1:
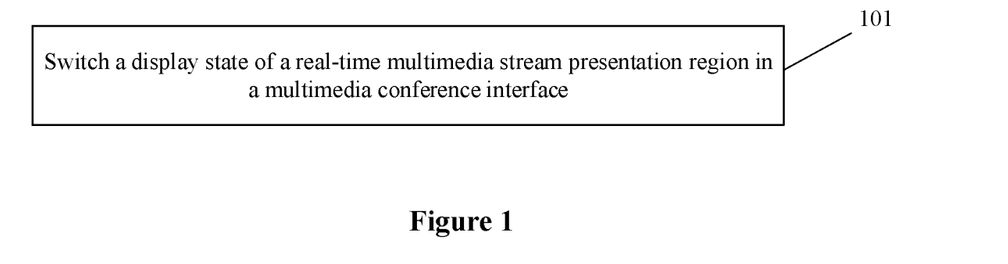
FIG. 1 is a flow chart of a display method according to an embodiment of the present disclosure.

Reference is made to FIG. 1, which shows a flow chart of a display method according to an embodiment of the present disclosure. As shown in FIG. 1, the display method includes the following step 101.

In step 101, a display state of a real-time multimedia stream presentation region is switched in a multimedia conference interface.

In the embodiment, an executing body (such as a terminal device) of the display method may switch the display state of the real-time multimedia stream presentation region in the multimedia conference interface.

In the embodiment, a multimedia conference may be an online conference by using a multimedia. The multimedia may include, but is not limited to, at least one of audio and video. The multimedia conference interface may be an interface related to a multimedia conference.

In the embodiment, the application that enables the multimedia conference may be any type of application, and is not limited herein. For example, the application may be an instant video conference application, a communication application, a video playback application, an email application, and/or an instant messaging application with a real-time multimedia communication function.

In the embodiment, the display state of the real-time multimedia stream presentation region may include an expanding state and a folding state.

In the embodiment, real-time multimedia streams may be displayed in the real-time multimedia stream presentation region.

In the embodiment, real-time multimedia stream may include at least one of the following but not limited to: a real-time video collected from a participant end, a mapping image of a real-time audio collected from a participant end, and the like. For example, for the real-time audio collected from the participant end, a spectrogram or a waveform of the real-time audio may be displayed as the mapping image.

The participants interact with the server with continuous multimedia data, and the multimedia data interacted between the participants and the server in real time may be vividly referred to as a real-time multimedia stream. The interaction between the participants and the server may include sending multimedia data from the participants to the server or sending multimedia data from the server to the participants.

It should be understood that in a case that the user determines not to present real-time multimedia stream, the real-time multimedia stream presentation region may present other content rather than the real-time multimedia stream. As an example, the other content may include but is not limited to: a user name and a user profile.

In the embodiment, the expanding state includes a state in which the real-time multimedia stream presentation region and a shared content region are displayed side by side.

Figure 2:
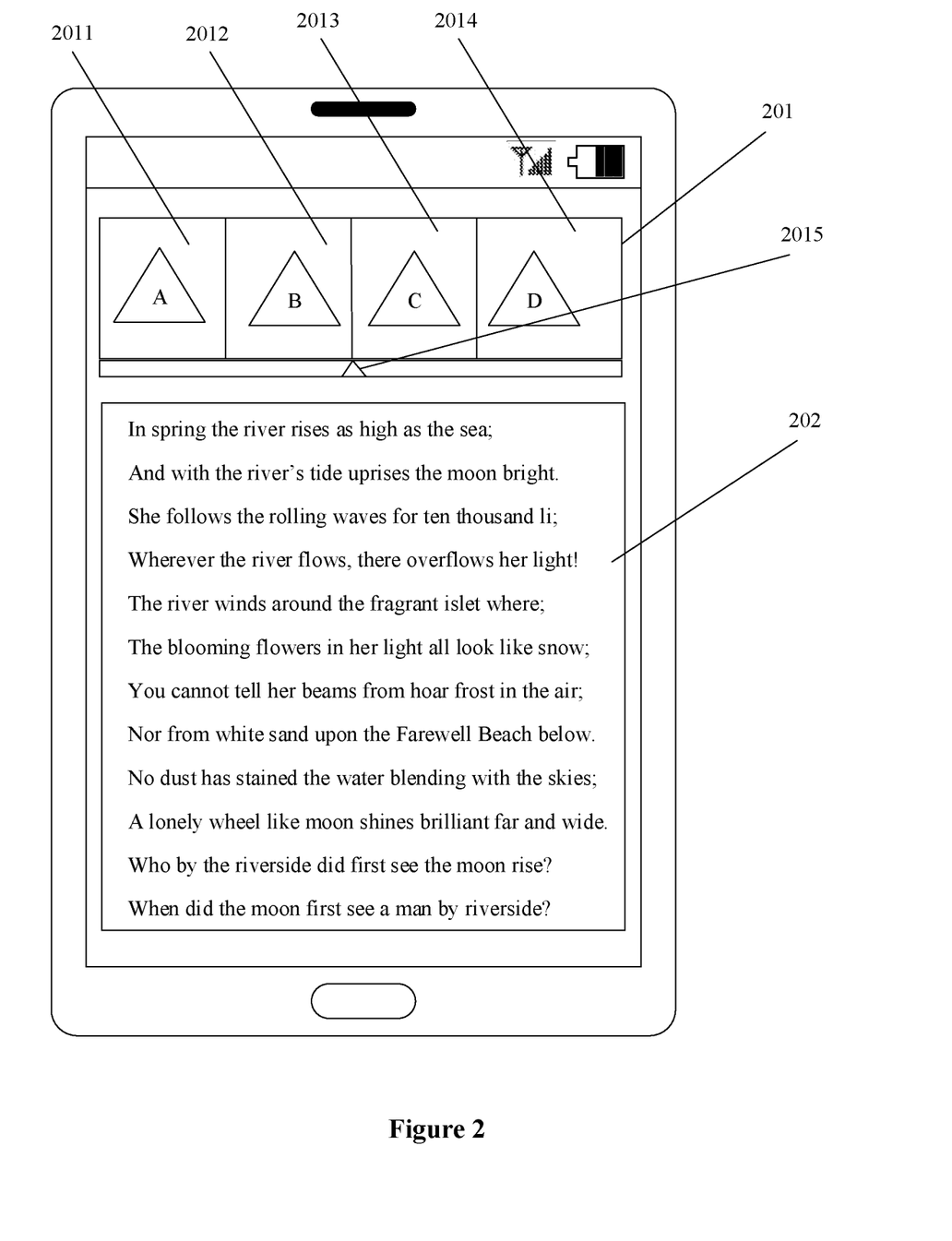
FIG. 2 is a schematic diagram of an application scenario of a display method according to the present disclosure.

Reference is made to FIG. 2, which shows a schematic diagram of the expanding state. In FIG. 2, the real-time multimedia stream presentation region 201 in the expanding state may be displayed side by side with the content sharing region 202. In the real-time multimedia stream presentation region 201 in the expanding state, real-time multimedia streams or user identities of the four participants A, B, C and D may be displayed.

In the embodiment, the folding state includes a state in which the real-time multimedia stream presentation region is folded.

Figure 3:
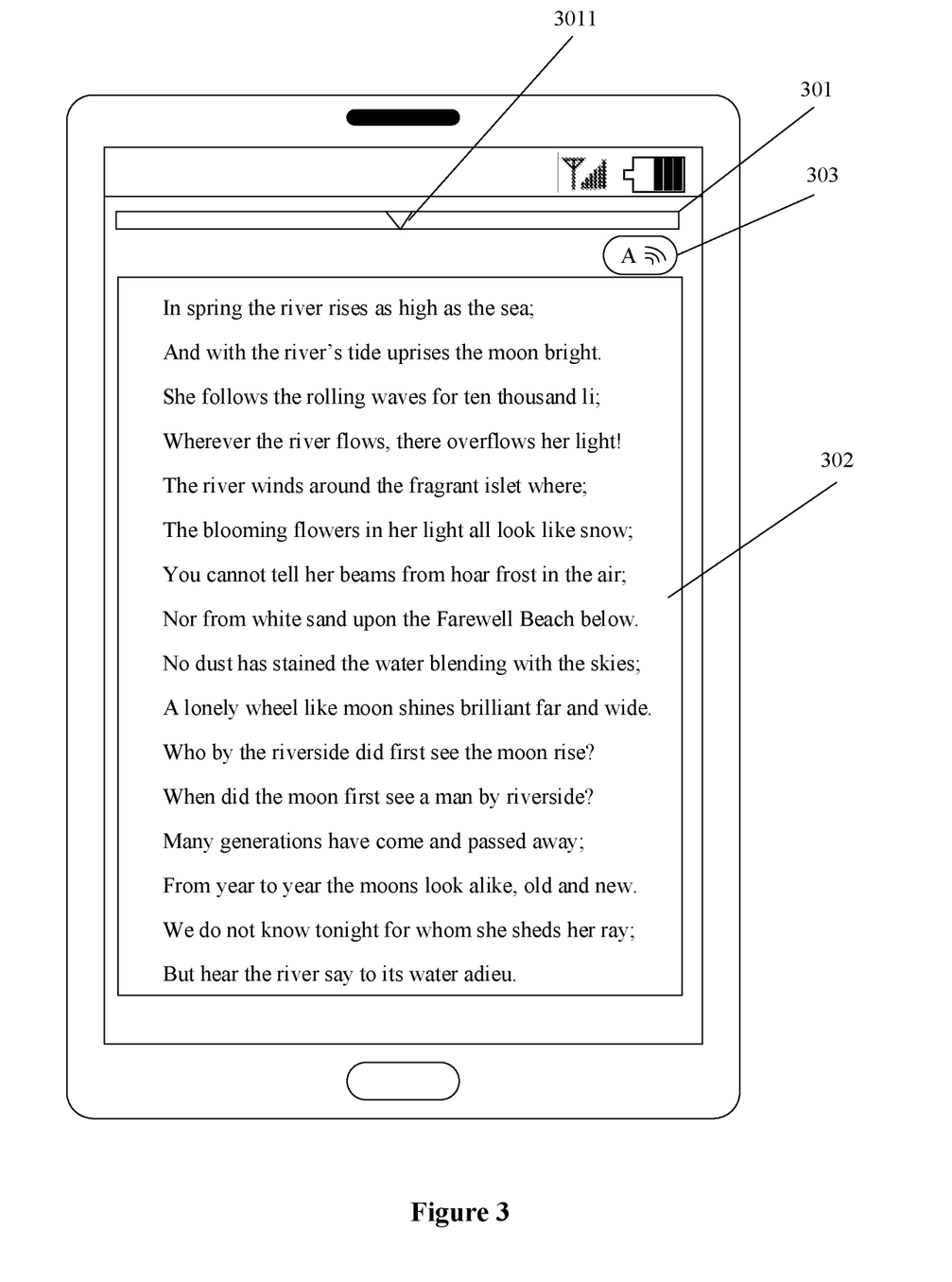
FIG. 3 is a schematic diagram of another application scenario of a display method according to the present disclosure.

Reference is made to FIG. 3, which shows a schematic diagram of the folding state. In FIG. 3, the real-time multimedia stream presentation region 301 in the folding state may be displayed side by side with the content sharing region 302.

It should be noted that with the display method according to the embodiment, a display state of a real-time multimedia stream presentation region may be switched in a multimedia conference interface. The real-time multimedia stream presentation region in the expanding state may be displayed side by side with the shared content region, providing the user with information about real-time multimedia streams without blocking shared contents. For the real-time multimedia stream presentation region in the folding state, the area of the real-time multimedia stream presentation region may be minimized. By performing switching between the expanding state and the folding state, flexible transformation of the real-time multimedia stream presentation region may be performed, achieving a balance between providing more content and occupying less space, flexibly adopting different display states based on actual situations of a multimedia conference, and thereby improving the efficiency of the multimedia conference.

In some embodiments, the method further includes: in response to initiating conference sharing, displaying the real-time multimedia stream presentation region in the expanding state.

The conference sharing instructs at least a part of participants in a multimedia conference to share contents.

In an embodiment, the content sharing in the multimedia conference may be performed between all participants or between a part of participants. In a case that the content sharing is performed between a part of participants, real-time multimedia streams of the part of participants performing content sharing may be displayed in the multimedia stream presentation region in the expanding state.

In an embodiment, the conference sharing may include but not be limited to at least one of: screen sharing and file sharing. The screen sharing may instruct a participant to share screen content with other participants. The file sharing may instruct a participant to share a file with other participants.

It should be noted that in initiating the conference sharing, the expanding state is triggered, and the real-time multimedia stream presentation region in the expanding state is displayed side by side with the shared content region, thereby timely presenting multiple multimedia streams in the multimedia stream presentation region without blocking the shared content region. That is, the timeliness of the presentation in the expanding state is improved.

In some embodiments, the expanding state and the folding state are display states in a first display mode in the multimedia conference interface.

In some embodiments, the step in which in response to initiating the conference sharing, the real-time multimedia stream presentation region is displayed in the expanding state include: in response to initiating the conference sharing, switching from a display mode different from the first display mode to the expanding state of the first display mode.

The display states of the first display mode may include the expanding state and the folding state.

The display mode mentioned above may be different from the first display mode.

Figure 4:
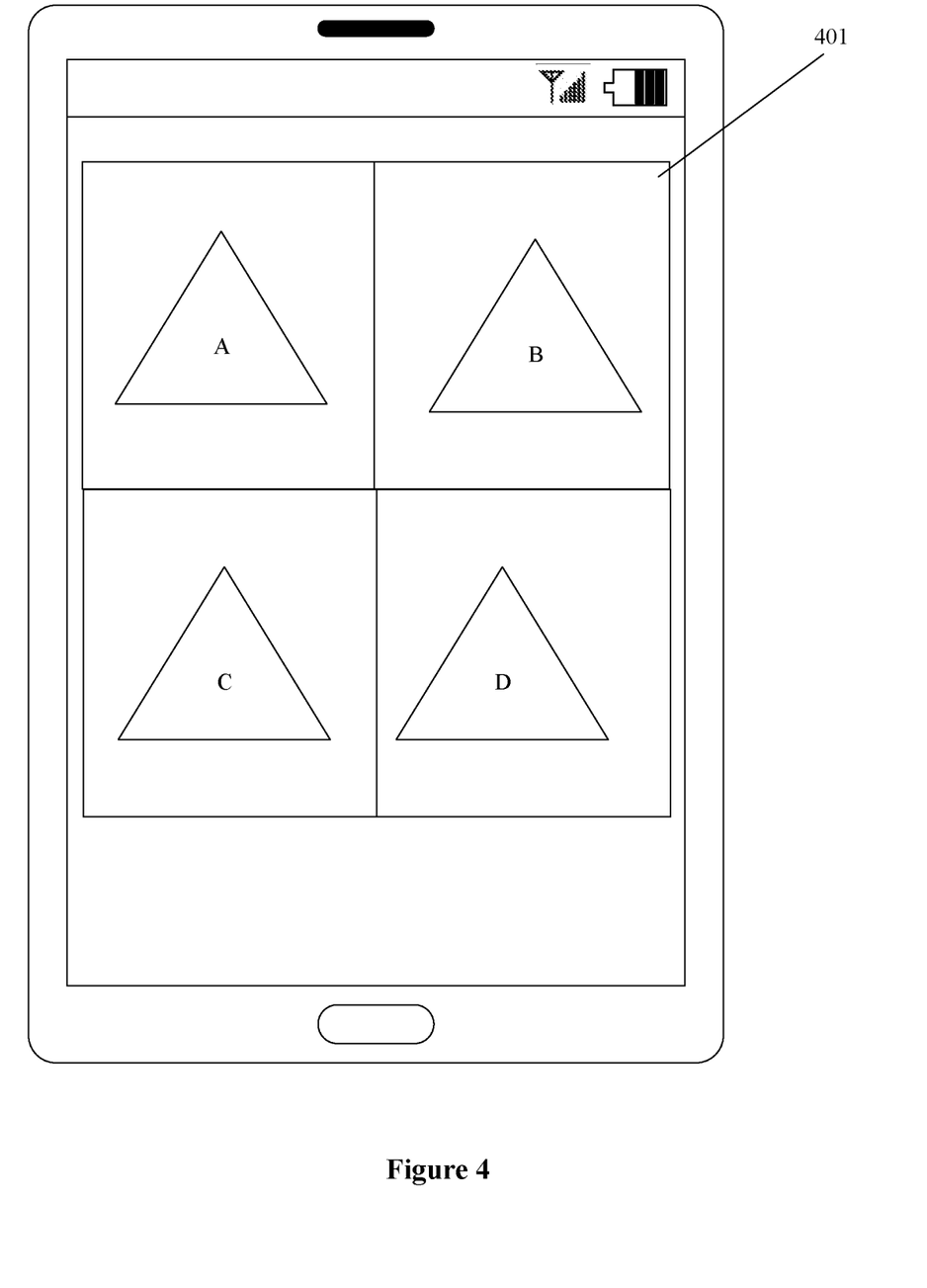
FIG. 4 is a schematic diagram of another application scenario of a display method according to the present disclosure.

As an example, reference is made to FIG. 4, which is a schematic diagram of a real-time multimedia stream displayed in another display mode. In the application scenario shown in FIG. 4, conference sharing is not triggered in the multimedia conference, or shared content is hidden. In FIG. 4, in a presentation view 401 of the real-time multimedia stream, real-time multimedia streams or user identities of four participants A, B, C and D are displayed.

It should be noted that by performing switching from other display mode to the expanding state of the first display mode, a transition from the other display mode to the first display mode when entering the first display mode may be realized. That is, in a case that the folding state is displayed after switching to the first mode, the user may wonder where the real-time multimedia stream is, resulting in some misoperations, and reducing the efficiency of the multimedia conference.

In some embodiments, the method may further include: displaying a real-time multimedia stream presentation unit in the real-time multimedia stream presentation region in the expanding state.

The real-time multimedia stream presentation unit may present a real-time multimedia stream. In a multimedia conference, there are generally at least two participants. Each of the participants may interact with the server for a real-time multimedia stream.

Reference is made to FIG. 2, which shows a schematic diagram of real-time multimedia stream presentation units. In FIG. 2, the real-time multimedia stream presentation region 201 may present a real-time multimedia stream presentation unit 2011, a real-time multimedia stream presentation unit 2012, a real-time multimedia stream presentation unit 2013, and a real-time multimedia stream presentation unit 2014.

It should be noted that using real-time multimedia stream presentation units corresponding to the users one-to-one for display, the real-time multimedia streams of the users may be distinguished, thereby improving the efficiency of the user obtaining information.

In some embodiments, the method may further include: in response to the number of participants being greater than a predetermined number, displaying the predetermined number of real-time multimedia stream presentation units in the real-time multimedia stream presentation region.

The predetermined number indicates the number of real-time multimedia stream presentation units that may be displayed in the real-time multimedia stream presentation region.

The number of multimedia stream presentation units that may be displayed in the real-time multimedia stream presentation region may be a predetermined limited number. In some scenarios, the number of the participants of the multimedia conference may be greater than the predetermined limited number. Thus, real-time multimedia stream presentation units of a part of participants may be presented in the multimedia stream presentation region, and real-time multimedia stream presentation units of another part of participants may be hidden.

Referring to FIG. 2, the number of real-time multimedia stream presentation units that may be displayed in the real-time multimedia stream presentation region is 4. In FIG. 2, real-time multimedia stream presentation units of participants E and F may be hidden.

It should be noted that in the real-time multimedia stream presentation region, a predetermined number of real-time multimedia stream presentation units are presented, achieving a balance between presenting more multimedia streams and reducing the area of the real-time multimedia stream presentation region.

In an embodiment, the hidden real-time multimedia stream presentation units may be displayed in various ways.

In an embodiment, an expanding control may be set. The method may further include: in response to detecting a triggering operation performed on the expanding control, enlarging the real-time multimedia stream presentation region to display more real-time multimedia stream presentation units.

In some embodiments, the method may further include: in response to detecting a viewing operation performed on the real-time multimedia stream presentation region, changing the real-time multimedia stream presentation unit displayed in the real-time multimedia stream presentation region.

The specific viewing operation may be set according to actual application scenarios, and is not limited herein.

In an embodiment, a real-time position of the viewing operation may be in the real-time multimedia stream presentation region or may be not in the real-time multimedia stream presentation region.

In an embodiment, the viewing operation may include a triggering operation (such as a click operation and a sliding operation) for a preset viewing control and/or a preset region.

It should be noted that in the process of changing the real-time multimedia stream presentation unit displayed in the real-time multimedia stream presentation region in response to detecting the viewing operation, the area of the real-time multimedia stream presentation region in not changed, adapting to a scenario in which the user does not find an expected participant in the real-time multimedia stream presentation unit currently displayed and wants to search in a real-time multimedia stream presentation unit corresponding to a participant that has not appeared. Thus, a probability of an existing real-time multimedia stream presentation unit continuously occupying a space is reduced, and the utility efficiency of the real-time multimedia stream presentation region is improved.

In some embodiments, the viewing operation may include a sliding operation. In response to detecting a sliding operation performed on the multimedia stream presentation region, the real-time multimedia stream presentation unit displayed in the real-time multimedia stream presentation region may be changed.

The real-time multimedia stream presentation unit displayed in the real-time multimedia stream presentation region may be changed by changing a real-time multimedia stream corresponding to a participant.

Figure 5:
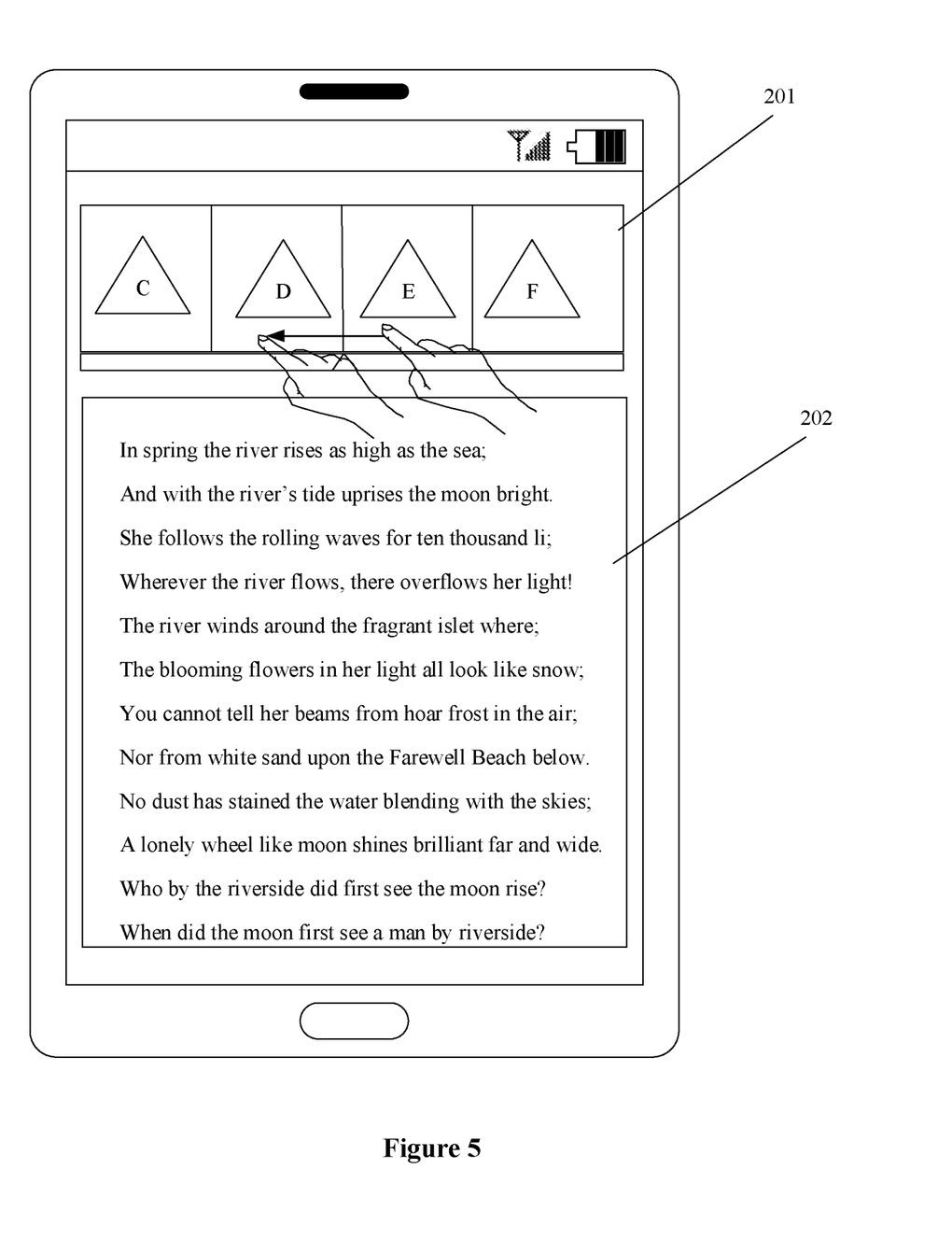
FIG. 5 is a schematic diagram of another application scenario of a display method according to the present disclosure.

As an example, reference is made to FIG. 5, which shows a schematic diagram of a viewing operation. Four real-time multimedia stream presentation units may be displayed in the real-time multimedia stream presentation region. Firstly, real-time multimedia stream presentation units of four participants A, B, C and D may be displayed in the real-time multimedia stream presentation region, which is not shown in FIG. 5. Then, the user may perform a left sliding operation, that is, a sliding operation from an end of an arrow in FIG. 5 to a beginning of the arrow. Thus, real-time multimedia stream presentation units corresponding to participants C, D, E and F may be displayed in the real-time multimedia stream presentation region. As the user increases the amplitude of the sliding operation, real-time multimedia stream presentation units corresponding to participants E, F, G and H may be displayed in the real-time multimedia stream presentation region.

It should be noted that the real-time multimedia stream presentation unit displayed in the real-time multimedia stream presentation region is changed by performing a sliding operation, facilitating the operation.

In some embodiments, a relative position relationship between the real-time multimedia stream presentation region and the shared content region may be an upper and lower position relationship or a left and right position relationship.

In an embodiment, for the real-time multimedia stream presentation region and the shared content region, the real-time multimedia stream presentation region may be displayed above the shared content region, or the shared content region may be displayed above the real-time multimedia stream presentation region.

In an embodiment, for the real-time multimedia stream presentation region and the shared content region, the real-time multimedia stream presentation region may be displayed on a left side of the shared content region, or the shared content region may be displayed on a left side of the real-time multimedia stream presentation region.

It should be noted that for the position relationship between the real-time multimedia stream presentation region and the shared content region, the real-time multimedia stream presentation region and the shared content region are displayed side by side and do not block each other from an observation perspective of the user. From a perspective of the user directly facing a screen of a terminal screen, the user may distinguish the upper and lower position relationship or the left and right position relationship between the real-time multimedia stream presentation region and the shared content region on the screen, which is not described herein.

It should be noted that the real-time multimedia stream presentation region and the shared content region are displayed side by side, avoiding the real-time multimedia stream presentation region blocking the content sharing region, and thereby achieving a balance between information presented by the real-time multimedia stream and information presented by the shared content.

It should be noted that real-time multimedia stream are presented in a region close to an edge of the interface, so that the shared region is complete and is within a focus region of the user. Thus, more shared content are displayed while simultaneously presenting real-time multimedia streams and shared content, improving the information display volume of the shared content, and improving the efficiency of the user obtaining information.

In some embodiments, the method may further include: in response to the real-time multimedia stream presentation region being in the folding state, displaying speaker prompt information indicating a current speaker.

In a case that the multimedia stream presentation region is in the folding state, speaker prompt information may be displayed. The speaker prompt information may indicate who the current speaker is. The display position and the prompt manner of the speaker prompt information may be set according to actual application scenarios, and are not limited herein.

As an example, referring to FIG. 3, speaker prompt information 303 in FIG. 3 may indicate that the current speaker is the participant A.

It should be noted that by displaying speaker prompt information of a current speaker in the folding state, the user is prompted with the current speaker in the folding state. Thus, key information is provided to the user, improving the efficiency of the user obtaining information while minimizing the real-time multimedia stream presentation region.

In some embodiments, the method may further include: in response to the real-time multimedia stream presentation region being switched from the expanding state to the folding state, expanding the shared content region; and in response to the real-time multimedia stream presentation region being switched from the folding state to the expanding state, reducing the shared content region.

As an example, FIG. 2 and FIG. 3 may be compared. The real-time multimedia stream presentation region 201 in FIG. 2 is in the expanding state, and the real-time multimedia stream presentation region 301 in FIG. 3 is in the folding state. The shared content region 202 in FIG. 2, which is displayed side by side with the real-time multimedia stream presentation region 201, is smaller in area compared to the shared content region 302 in FIG. 3. It can be seen that in a case that the real-time multimedia stream presentation region is switched from the expanding state to the folding state, that is, from FIG. 2 to FIG. 3, the shared content region may be expanded; and in a case that the real-time multimedia stream presentation region is switched from the folding state to the expanding state, that is, from FIG. 3 to FIG. 2, the shared content region may be reduced.

Therefore, based on the actual multimedia conference situation, the size of the shared content region may be changed by adjusting the size of the real-time multimedia stream presentation region. Thus, the display area of the shared content region meets requirements of actual scenarios and meets the requirement of the user for displaying more shared content or viewing real-time multimedia streams, timely providing information required by the user with a limited screen area, thereby improving the efficiency of multimedia conferences.

In some embodiments, the step 101 may include: switching the display state in response to detecting a predefined switching operation.

The switching operation may be set according to actual application scenarios, and is not limited herein.

The switching the display state may include performing switching between the expanding state and the folding state.

It should be noted that by performing a switching operation by the user to switch the display state, the display state of the multimedia stream presentation region may be switched timely by the user based on the requirements of the user for the multimedia conference interface, improving the timeliness and accuracy of the switching.

In some embodiments, the switching operation may include a folding operation. The folding operation may include, but is not limited to, at least one of: an operation of triggering a preset folding control and an operation of performing a predefined folding gesture.

As an example, referring to FIG. 2, the folding control 2015 in FIG. 2 may respond to a triggering operation of the user, and the triggering operation of the user triggering the folding control may be understood as a folding operation.

As an example, referring to FIG. 2, a sliding operation from bottom to top may be performed on the multimedia conference interface. This sliding operation from bottom to top may be understood as a folding operation.

It should be noted that by setting the folding control, the user may be clearly prompted for a way to switch to the folding state, omitting the step for the user to search for information or attempt to realize.

It should be noted that by responding to the folding gesture, the area occupied by the folding control may be reduced, avoiding the user triggering a certain region on the screen before performing switching. That is, the convenience of performing an expanding operation may be improved by using the folding gesture.

In some embodiments, the switching operation may include an expanding operation. The expanding operation may include, but is not limited to, at least one of: an operation of triggering a preset expanding control and an operation of performing a predefined expanding gesture.

As an example, referring to FIG. 3, the expanding control 3011 in FIG. 3 may respond to a triggering operation of the user, and the triggering operation of the user triggering the expanding control may be understood as a folding operation.

As an example, referring to FIG. 3, a sliding operation from top to bottom may be performed on the multimedia conference interface. This sliding operation from top to bottom may be understood as an expanding operation.

It should be noted that by setting the expanding control, the user may be clearly prompted for a way to switch to the expanding state, omitting the step for the user to search for information or attempt to realize.

It should be noted that by responding to the expanding gesture, it may be avoided for the user to trigger a certain region on the screen before performing switching. That is, the convenience of performing an expanding operation may be improved by using the expanding gesture.

In some embodiments, the real-time multimedia stream presentation region is displayed above the shared content region. The step 101 may include: in response to detecting an upward sliding operation performed on the real-time multimedia stream presentation region in the expanding state, switching the real-time multimedia stream presentation region to the folding state.

It should be noted that, the real-time multimedia stream presentation region is displayed above the shared content region, the real-time multimedia stream presentation region is folded up by performing an upward sliding operation, thus the direction in which the real-time multimedia stream presentation region is folded up is consistent with the direction of the gesture, conforming to the user's general understanding of things, and improving the user's acceptance speed and implementation convenience for operations.

In some embodiments, the real-time multimedia stream presentation region is displayed above the shared content region. The step 101 may include: in response to detecting a downward sliding operation performed on the real-time multimedia stream presentation region in the folding state, switching the real-time multimedia stream presentation region to the expanding state.

It should be noted that, the real-time multimedia stream presentation region is displayed above the shared content region, the real-time multimedia stream presentation region is expanded by performing a downward sliding operation, thus the direction in which the real-time multimedia stream presentation region is expanded is consistent with the direction of the gesture, conforming to the user's general understanding of things, and improving the user's acceptance speed and implementation convenience for operations.

In some embodiments, the real-time multimedia stream presentation region is displayed below the shared content region. The step 101 may include: in response to detecting a downward sliding operation performed on the real-time multimedia stream presentation region in the expanding state, switching the real-time multimedia stream presentation region to the folding state.

It should be noted that, the real-time multimedia stream presentation region is displayed below the shared content region, the real-time multimedia stream presentation region is folded up by performing a downward sliding operation, thus the direction in which the real-time multimedia stream presentation region is folded up is consistent with the direction of the gesture, conforming to the user's general understanding of things, and improving the user's acceptance speed and implementation convenience for operations.

In some embodiments, the real-time multimedia stream presentation region is displayed below the shared content region. The step 101 may include: in response to detecting an upward sliding operation performed on the real-time multimedia stream presentation region in the folding state, switching the real-time multimedia stream presentation region to the expanding state.

It should be noted that, the real-time multimedia stream presentation region is displayed below the shared content region, the real-time multimedia stream presentation region is expanded by performing an upward sliding operation, thus the direction in which the real-time multimedia stream presentation region is expanded is consistent with the direction of the gesture, conforming to the user's general understanding of things, and improving the user's acceptance speed and implementation convenience for operations.

In some embodiments, the step 101 may include: in response to meeting an automatic switching condition, automatically switching the display state.

The automatically switching the display state may include: switching the real-time multimedia stream presentation region between the expanding state and the folding state.

The automatic switching may be performed automatically by a computer, rather than by a human user.

The automatic switching condition may be configured according to the actual application scenarios, and is not limited herein.

In an embodiment, the automatic switching condition may include multiple condition items. In a case that any one of the condition items is met, the display state may be automatically switched.

It should be noted that by configuring the automatic switching condition, a computer may automatically switch the display state of the real-time multimedia stream presentation region, improving the convenience of the multimedia conference and reducing the operations of the user.

In some embodiments, the automatic switching condition may include a time period condition. The step of in response to meeting an automatic switching condition, automatically switching the display state may include: in response to determining that a time period in which no operation is performed in the folding state is greater than a predetermined time period, switching from the expanding state to the folding state.

The time period condition may include a condition in which a time period in which no operation is performed by the user in the folding state is greater than a predetermined time period. That is, in the multimedia conference, in a case that a time period in which the user does not perform any operation is long, such as greater than a predetermined time period, it may be determined that the automatic switching condition is met. In a case that the automatic switching condition is met, the real-time multimedia stream presentation region may be switched from the expanding state to the folding state.

It should be noted that in a case that the user performs no operation for a long time, the real-time multimedia stream presentation region is automatically switched to the expanding state, increasing the display area of the shared content region without affecting the user obtaining the information about the participants. Therefore, the overall information presentation efficiency of the multimedia conference interface is improved.

In some embodiments, the automatic switching condition may include a condition in which participants change in the folding state. The above step of in response to meeting an automatic switching condition, automatically switching the display state may include: in response to determining that participants change in the folding state, switching from the folding state to the expanding state.

The change of the participants may include, but not limited to, at least one of: an increase of the participants, a decrease of the participants, and a replacement of the participants (such as equal number of participants entering and exiting).

It should be noted that in a case that participants change, the real-time multimedia stream presentation region is automatically switched to the expanding state, timely displaying the information of the participants to the user, ensuring the timeliness of information presentation, reducing the operations performed by the user for obtaining information, and thereby improving the convenience of the multimedia conference.

Figure 6:
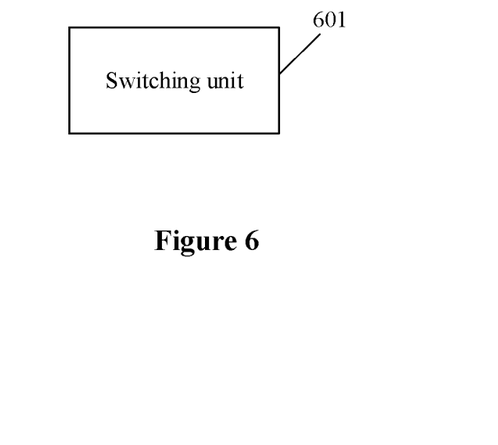
FIG. 6 is a schematic structural diagram of a display apparatus according to an embodiment of the present disclosure.

Further referring to FIG. 6, as an implementation of the method shown in the above Figures, a display apparatus is provided according to an embodiment of the present disclosure. The apparatus embodiments correspond to the method embodiments shown in FIG. 1. The apparatus may be applied to various electronic devices.

As shown in FIG. 6, the display apparatus in the embodiment includes a switching unit 601. The switching unit is configured to switch a display state of a real-time multimedia stream presentation region in a multimedia conference interface. The display state includes an expanding state and a folding state. The expanding state includes a state in which the real-time multimedia stream presentation region and a shared content region are displayed side by side. The folding state includes a state in which the real-time multimedia stream presentation region is folded.

The specific processing and the corresponding technical effects of the switching unit 601 of the interaction apparatus in the embodiment may refer to the descriptions of the step 101 in the corresponding embodiments shown in FIG. 1, and are not repeated herein.

In some embodiments, the apparatus is further configured to: in response to initiating conference sharing, display the real-time multimedia stream presentation region in the expanding state. The conference sharing instructs at least a part of participants in a multimedia conference to share contents.

In some embodiments, the expanding state and the folding state are display states in a first display mode in the multimedia conference interface. The operation of in response to initiating conference sharing, displaying the real-time multimedia stream presentation region in the expanding state includes: in response to initiating the conference sharing, switching from a display mode different from the first display mode to the expanding state of the first display mode.

In some embodiments, the apparatus is further configured to: display a real-time multimedia stream presentation unit in the real-time multimedia stream presentation region in the expanding state.

In some embodiments, the apparatus is further configured to: in response to the number of participants being greater than a predetermined number, display the predetermined number of real-time multimedia stream presentation units in the real-time multimedia stream presentation region. The predetermined number indicates the number of real-time multimedia stream presentation units that can be displayed in the real-time multimedia stream presentation region.

In some embodiments, the apparatus is further configured to: in response to detecting a viewing operation performed on the real-time multimedia stream presentation region, change the real-time multimedia stream presentation unit displayed in the real-time multimedia stream presentation region.

In some embodiments, the viewing operation includes a sliding operation.

In some embodiments, a relative position relationship between the real-time multimedia stream presentation region and the shared content region is an upper and lower position relationship or a left and right position relationship.

In some embodiments, the apparatus is further configured to: in response to the real-time multimedia stream presentation region being in the folding state, display speaker prompt information indicating a current speaker.

In some embodiments, the apparatus is further configured to: in response to the real-time multimedia stream presentation region being switched from the expanding state to the folding state, expand the shared content region; and in response to the real-time multimedia stream presentation region being switched from the folding state to the expanding state, reduce the shared content region.

In some embodiments, the operation of switching the display state of the real-time multimedia stream presentation region in the multimedia conference interface includes: switching the display state in response to detecting a predefined switching operation.

In some embodiments, the switching operation includes a folding operation. The folding operation includes at least one of: an operation of triggering a preset folding control and an operation of performing a predefined folding gesture.

In some embodiments, the switching operation includes an expanding operation. The expanding operation includes at least one of: an operation of triggering a preset expanding control and an operation of performing a predefined expanding gesture.

In some embodiments, the real-time multimedia stream presentation region is displayed above the shared content region. The operation of switching the display state of the real-time multimedia stream presentation region in the multimedia conference interface includes: in response to detecting an upward sliding operation performed on the real-time multimedia stream presentation region in the expanding state, switching the real-time multimedia stream presentation region to the folding state.

In some embodiments, the real-time multimedia stream presentation region is displayed above the shared content region. The operation of switching the display state of the real-time multimedia stream presentation region in the multimedia conference interface includes: in response to detecting a downward sliding operation performed on the real-time multimedia stream presentation region in the folding state, switching the real-time multimedia stream presentation region to the expanding state.

In some embodiments, the real-time multimedia stream presentation region is displayed below the shared content region. The operation of switching the display state of the real-time multimedia stream presentation region in the multimedia conference interface includes: in response to detecting a downward sliding operation performed on the real-time multimedia stream presentation region in the expanding state, switching the real-time multimedia stream presentation region to the folding state.

In some embodiments, the real-time multimedia stream presentation region is displayed below the shared content region. The operation of switching the display state of the real-time multimedia stream presentation region in the multimedia conference interface includes: in response to detecting an upward sliding operation performed on the real-time multimedia stream presentation region in the folding state, switching the real-time multimedia stream presentation region to the expanding state.

In some embodiments, the operation of switching the display state of the real-time multimedia stream presentation region in the multimedia conference interface includes: in response to meeting an automatic switching condition, automatically switching the display state.

In some embodiments, the automatic switching condition includes a time period condition. The operation of in response to meeting the automatic switching condition, automatically switching the display state includes: in response to determining that a time period in which no operation is performed in the folding state is greater than a predetermined time period, switching from the expanding state to the folding state.

In some embodiments, the operation of in response to meeting the automatic switching condition, automatically switching the display state includes: in response to determining that participants change in the folding state, switching from the folding state to the expanding state.

Figure 7:
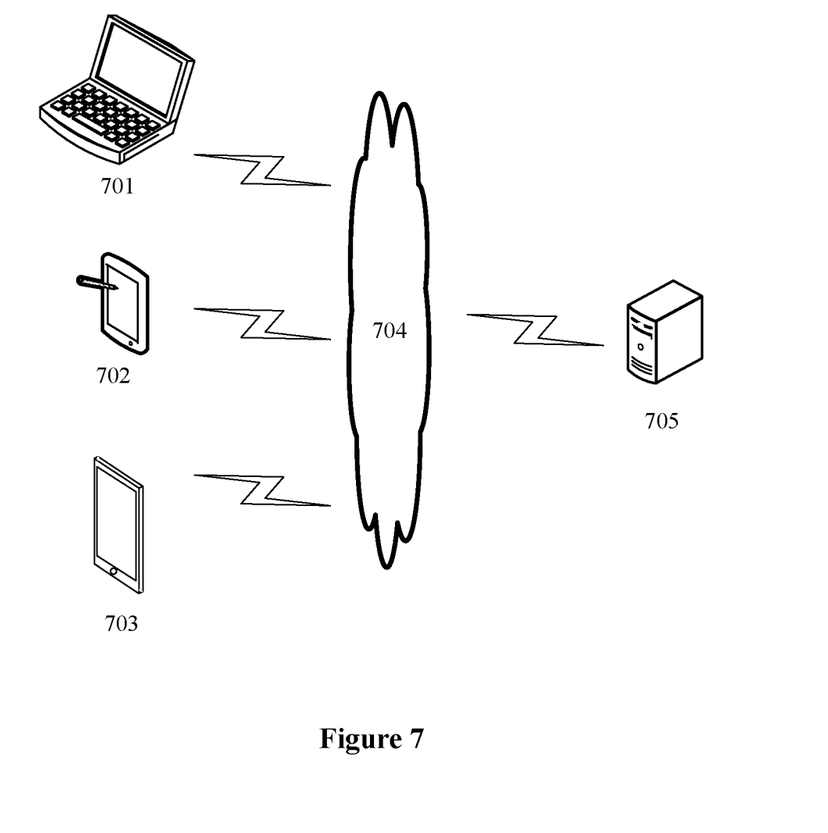
FIG. 7 shows an exemplary system architecture to which a display method according to an embodiment of the present disclosure may be applied.

Reference is made to FIG. 7, which shows an exemplary system architecture to which a display method according to an embodiment of the present disclosure may be applied.

As shown in FIG. 7, the system architecture may include terminal devices 701, 702 and 703, a network 704, and a server 705. The network 704 is configured to provide a medium for communication links between the terminal devices 701, 702, 703 and the server 705. The network 704 may include various connections, such as connections based on wired communication links, connections based on wireless communication links, or connections based on fiber optic cables.

The terminal devices 701, 702, and 703 may communicate with the server 705 via the network 704 to receive or transmit messages. Various client applications, such as web browser applications, search applications, and news information applications, may be installed on the terminal devices 701, 702 and 703. The client applications installed on the terminal devices 701, 702, and 703 may receive an instruction from the user, and perform a function based on the instruction from the user, such as adding information based on the instruction from the user.

The terminal devices 701, 702, and 703 may be in a form of hardware or software. In a case that the terminal devices 701, 702, and 703 are in a form of hardware, the terminal devices 701, 702, and 703 may be various electronic devices that have a display screen and support web browsing, including but not limited to smart phones, tablet computers, e-book readers, MP3 (Moving Picture Experts Group Audio Layer III) players, MP4 (Moving Picture Experts Group Audio Layer IV) players, laptops and desktops. In a case that the terminal devices 701, 702, and 703 are in a form of software, the terminal devices 701, 702, and 703 may be installed in the electronic devices listed above. The terminal devices 701, 702, and 703 may be implemented as multiple software or software modules (such as software or software modules for providing distributed services), or may be implemented as a single software or software module, which is not limited herein.

The server 705 may provide various services. For example, the server 705 may receive information acquisition requests from the terminal devices 701, 702, and 703, obtain display information corresponding to the information acquisition request in various ways based on the information acquisition request, and transmit data of the display information to the terminal devices 701, 702, and 703.

It should be noted that the display method according to the embodiments of the present disclosure may be performed by a terminal device, and the display apparatus may be arranged in the terminal devices 701, 702, and 703. In addition, the display method according to the embodiments of the present disclosure may be performed by the server 705, and the display apparatus may be arranged in the server 705.

It should be understood that the numbers of terminal devices, networks and servers in FIG. 7 are only illustrative, and any number of numbers of terminal devices, networks and servers may be configured according to implementation requirements.

Hereinafter, reference is made to FIG. 8, which shows a schematic structural diagram of an electronic device (such as the terminal device or the server shown in FIG. 7) suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The electronic device shown in FIG. 8 is only exemplary, and should not indicate any limitation to the function and application scope of the embodiments of the present disclosure.

Figure 8:
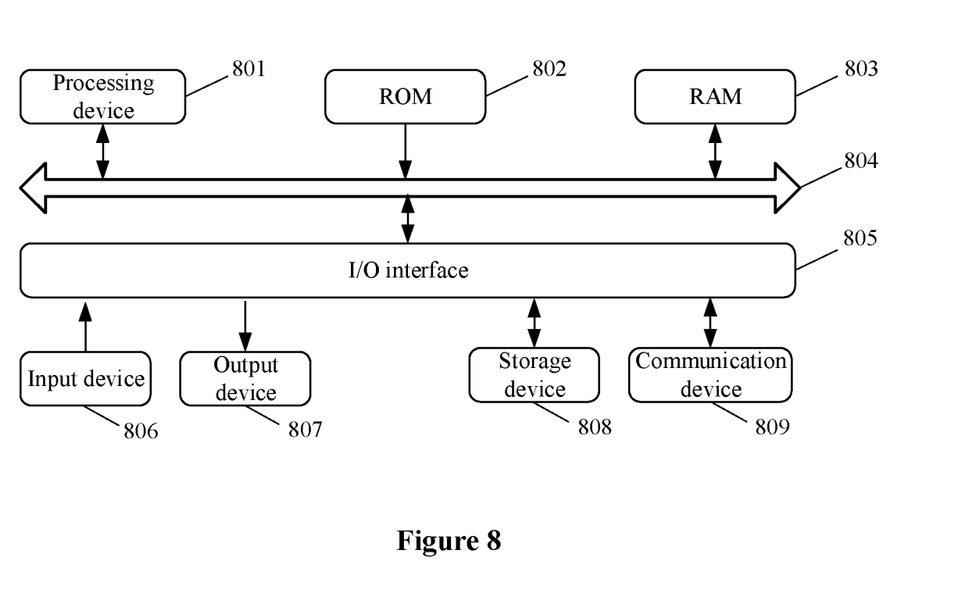
FIG. 8 is a schematic structural diagram of an electronic device according to an embodiment of the present disclosure.

As shown in FIG. 8, the electronic device may include a processing device 801 (such as a central processor and a graphics processor) which may execute various operations and processing through a program stored in a Read Only Memory (ROM) 802 or a program loaded from the storage device 908 into a Random Access Memory (RAM) 803. The RAM 803 is further configured to store various programs and data required by the electronic device 900. The processing device 801, the ROM 802 and the RAM 803 are connected to each other through a bus 804. An Input/output (I/O) interface 805 is also connected to the bus 804.

Generally, the I/O interface 805 may be connected to: an input device 806, such as a touch screen, a touch panel, a keyboard, a mouse, a camera, a microphone, an accelerometer, and a gyroscope; an output device 807, such as a liquid crystal display (LCD), a speaker, and a vibrator; a storage device 808 such as a magnetic tape and a hard disk; and a communication device 809. The communication device 809 enables the electronic device to perform wireless or wired communication with other devices for data exchanging. Although FIG. 8 shows an electronic device having various components, it should be understood that the illustrated components are not necessarily required to all be implemented or included. Alternatively, more or fewer components may be implemented or included.

Particularly, according to some embodiments of the present disclosure, the process described above in conjunction with flow charts may be implemented as a computer software program. For example, a computer program product is further provided according to an embodiment of the present disclosure, including a computer program carried on a computer readable medium. The computer program includes program codes for performing the method shown in the flow charts. In the embodiment, the computer program may be downloaded and installed from the network via the communication device 809, or installed from the storage device 808, or installed from the ROM 802. When the computer program is executed by the processing device 801, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device, or may exist alone without being assembled into the electronic device.

The computer readable medium carries one or more programs. The one or more programs, when being executed by the electronic device, cause the electronic device to: switch a display state of a real-time multimedia stream presentation region in a multimedia conference interface. The display state includes an expanding state and a folding state, the expanding state includes a state in which the real-time multimedia stream presentation region and a shared content region are displayed side by side, and the folding state includes a state in which the real-time multimedia stream presentation region is folded.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and block diagrams in the Figures shows the architecture, functionality and operation of possible implementations of the products of system, method and computer program provided according to the embodiments of the present disclosure. Each block in the flow charts or block diagrams can represent a module, a program segment, or a part of codes, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the block diagrams and/or flow charts, and combinations of blocks in the block diagrams and/or flowcharts, can be implemented by a dedicated hardware-based system which is configured to implement specified functions or operations, or can be implemented by using a combination of dedicated hardware and computer instructions.

The units mentioned in the description of the embodiments of the present disclosure may be implemented by means of software, or otherwise by means of hardware. The designation of these units does not in any case constitute a qualification of the unit itself. For example, the switching unit may also be described as "a unit that switches a display state of a real-time multimedia stream presentation region in a multimedia conference interface".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD), and so on.

In the present disclosure, a machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

The invention claimed is:

1. A display method, comprising:
  switching a display state of a real-time multimedia stream presentation region in a multimedia conference interface between an expanding state and a folding state, wherein the expanding state and the folding state are display states in a first display mode of the multimedia conference interface, wherein the real-time multimedia stream presentation region displays real-time multimedia streams or user identities of participants of a multimedia conference, and wherein the real-time multimedia stream presentation region indicates a current speaker among the participants;
  in response to switching the display state of the real-time multimedia stream presentation region from the expanding state to the folding state, hiding the real-time multimedia stream presentation region from the multimedia conference interface, expanding a shared content region within the multimedia conference interface, and displaying an indicator of the current speaker within the multimedia conference interface;
  in response to switching the display state of the real-time multimedia presentation region from the folding state to the expanding state, shrinking the shared content region within the multimedia conference interface, displaying with in the multimedia conference interface the real-time multimedia stream presentation region side by side with the shared content region without blocking the shared content region, and discontinuing the display of the indicator; and
  in response to initiating conference sharing when the multimedia conference interface is in a second display mode, switching from the second display mode to the expanding state of the first display mode, wherein the second display mode is a display mode in which the shared content region is not displayed within the multimedia conference interface.

2. The method according to claim 1, wherein the conference sharing instructs sharing contents among at least a subset of participants in a multimedia conference.

3. The method according to claim 1, further comprising:
  displaying a real-time multimedia stream presentation unit in the real-time multimedia stream presentation region in the expanding state.

4. The method according to claim 3, further comprising:
  in response to the number of participants being greater than a predetermined number, displaying the predetermined number of real-time multimedia stream presentation units in the real-time multimedia stream presentation region, wherein the predetermined number indicates the number of real-time multimedia stream presentation units that the real-time multimedia stream presentation region is capable of displaying.

5. The method according to claim 4, further comprising:
  in response to detecting a viewing operation performed on the real-time multimedia stream presentation region, changing the real-time multimedia stream presentation unit displayed in the real-time multimedia stream presentation region.

6. The method according to claim 5, wherein the viewing operation comprises a sliding operation.

7. The method according to claim 1, wherein
a relative position relationship between the real-time multimedia stream presentation region and the shared content region is an upper and lower position relationship or a left and right position relationship.

8. The method according to claim 1, wherein the switching a display state of a real-time multimedia stream presentation region in a multimedia conference interface comprises:
switching the display state in response to detecting a predefined switching operation.

9. The method according to claim 8, wherein the switching operation comprises a folding operation, and the folding operation comprises at least one of:
an operation of triggering a preset folding control; and
an operation of performing a predefined folding gesture.

10. The method according to claim 8, wherein the switching operation comprises an expanding operation, and the expanding operation comprises at least one of:
an operation of triggering a preset expanding control; and
an operation of performing a predefined expanding gesture.

11. The method according to claim 1,
wherein the real-time multimedia stream presentation region is displayed above the shared content region; and
wherein the switching a display state of a real-time multimedia stream presentation region in a multimedia conference interface comprises:
in response to detecting an upward sliding operation performed on the real-time multimedia stream presentation region in the expanding state, switching the real-time multimedia stream presentation region to the folding state, or
in response to detecting a downward sliding operation performed on the real-time multimedia stream presentation region in the folding state, switching the real-time multimedia stream presentation region to the expanding state.

12. The method according to claim 1,
wherein the real-time multimedia stream presentation region is displayed below the shared content region; and
wherein the switching a display state of a real-time multimedia stream presentation region in a multimedia conference interface comprises:
in response to detecting a downward sliding operation performed on the real-time multimedia stream presentation region in the expanding state, switching the real-time multimedia stream presentation region to the folding state, or
in response to detecting an upward sliding operation performed on the real-time multimedia stream presentation region in the folding state, switching the real-time multimedia stream presentation region to the expanding state.

13. The method according to claim 1, wherein the switching a display state of a real-time multimedia stream presentation region in a multimedia conference interface comprises:
in response to meeting an automatic switching condition, automatically switching the display state.

14. The method according to claim 13,
wherein the automatic switching condition comprises a time period condition; and
wherein the in response to meeting an automatic switching condition, automatically switching the display state comprises:
in response to determining that a time period in which no operation is performed in the folding state is greater than a predetermined time period, switching from the expanding state to the folding state.

15. The method according to claim 13, wherein the in response to meeting an automatic switching condition, automatically switching the display state comprises:
in response to determining that participants change in the folding state, switching from the folding state to the expanding state.

16. A display apparatus, comprising:
at least one processor; and
at least one memory communicatively coupled to the at least one processor and storing instructions that upon execution by the at least one processor cause the apparatus to:
switch a display state of a real-time multimedia stream presentation region in a multimedia conference interface between an expanding state and a folding state, wherein the expanding state and the folding state are display states in a first display mode of the multimedia conference interface, wherein the real-time multimedia stream presentation region displays real-time multimedia streams or user identities of participants of a multimedia conference, and wherein the real-time multimedia stream presentation region indicates a current speaker among the participants;
in response to switching the display state of the real-time multimedia stream presentation region from the expanding state to the folding state, hide the real-time multimedia stream presentation region from the multimedia conference interface, expand a shared content region within the multimedia conference interface, and display an indicator of the current speaker within the multimedia conference interface;
in response to switching the display state of the real-time multimedia presentation region from the folding state to the expanding state, shrink the shared content region within the multimedia conference interface, display within the multimedia conference interface the real-time multimedia stream presentation region side by side with the shared content region without blocking the shared content region, and discontinue the display of the indicator; and
in response to initiating conference sharing when the multimedia conference interface is in a second display mode, switch from the second display mode to the expanding state of the first display mode, wherein the second display mode is a display mode in which the shared content region is not displayed within the multimedia conference interface.

17. A non-transitory computer-readable storage medium, bearing computer-readable instructions that upon execution on a computing device cause the computing device at least to:
switch a display state of a real-time multimedia stream presentation region in a multimedia conference interface between an expanding state and a folding state, wherein the expanding state and the folding state are display states in a first display mode of the multimedia conference interface, wherein the real-time multimedia stream presentation region displays real-time multimedia streams or user identities of participants of a multimedia conference, and wherein the real-time multimedia stream presentation region indicates a current speaker among the participants;

in response to switching the display state of the real-time multimedia stream presentation region from the expanding state to the folding state, hide the real-time multimedia stream presentation region from the multimedia conference interface, expand a shared content region within the multimedia conference interface, and display an indicator of the current speaker within the multimedia conference interface;

in response to switching the display state of the real-time multimedia presentation region from the folding state to the expanding state, shrink the shared content region within the multimedia conference interface, display within the multimedia conference interface the real-time multimedia stream presentation region side by side with the shared content region without blocking the shared content region, and discontinue the display of the indicator; and in response to initiating conference sharing when the multimedia conference interface is in a second display mode, switch from the second display mode to the expanding state of the first display mode, wherein the second display mode is a display mode in which the shared content region is not displayed within the multimedia conference interface.

* * * * *